United States Patent
Chung et al.

(10) Patent No.: US 11,516,364 B2
(45) Date of Patent: Nov. 29, 2022

(54) POWER SWITCHING DEVICE AND IMAGE PROCESSING DEVICE WITH POWER SWITCHING DEVICE

(71) Applicant: HONG FU JIN PRECISION INDUSTRY (WuHan) CO., LTD., Wuhan (CN)

(72) Inventors: Ming-Hung Chung, New Taipei (TW); Hsiu-Hao Cheng, New Taipei (TW)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 116 days.

(21) Appl. No.: 17/000,623

(22) Filed: Aug. 24, 2020

(65) Prior Publication Data

US 2022/0038595 A1     Feb. 3, 2022

Related U.S. Application Data (63) Continuation-in-part of application No. PCT/CN2020/106325, filed on Jul. 31, 2020.

(51) Int. Cl.
| | |
|---|---|
| H04N 1/00 | (2006.01) |
| F16H 19/06 | (2006.01) |
| F16H 19/04 | (2006.01) |
| F16D 11/16 | (2006.01) |
| F16H 25/18 | (2006.01) |
| H04N 1/12 | (2006.01) |

(52) U.S. Cl.
CPC ......... *H04N 1/00904* (2013.01); *F16D 11/16* (2013.01); *F16H 19/04* (2013.01); *F16H 19/0645* (2013.01); *F16H 25/183* (2013.01); *H04N 1/00557* (2013.01); *H04N 1/00599* (2013.01); *H04N 1/12* (2013.01)

(58) Field of Classification Search
CPC ........... H04N 1/00904; H04N 1/00557; H04N 1/00599; H04N 1/12; F16D 11/16; F16D 11/14; F16H 19/04; F16H 19/0645; F16H 25/183
USPC ........................................................ 358/1.13
See application file for complete search history.

(56) References Cited

U.S. PATENT DOCUMENTS

2004/0021760 A1\*   2/2004   Tokunaga .............. G03G 15/01
                                                                  347/238

\* cited by examiner

*Primary Examiner* — Darryl V Dottin
(74) *Attorney, Agent, or Firm* — ScienBiziP, P.C.

(57) ABSTRACT

A power switching device for switching power between translational motion and rotational motion includes an active gear, a transmission mechanism, a translation mechanism, a functional gear, and a reset mechanism. The active gear can rotate in a first direction or a second direction opposite the first direction. The translation mechanism includes a runner and a pushing member. The active gear can switch between a first position and a second position. In the first position, the active gear meshes with the runner and rotates in the first direction or the second direction to drive the runner to rotate. In the second position, the active gear meshes with the transmission gear and rotates in the second direction to drive the functional gear to rotate.

10 Claims, 10 Drawing Sheets

POWER SWITCHING DEVICE AND IMAGE PROCESSING DEVICE WITH POWER SWITCHING DEVICE

FIELD

The application relates to a power switching device and an image processing device with the power switching device.

BACKGROUND

An image scanning device with an automatic paper feeding device includes a flatbed scanning mechanism and an automatic paper feeding mechanism. These two mechanisms usually have their own power source to drive the flatbed scanning mechanism and the automatic paper feeding mechanism, but their high cost becomes a problem.

SUMMARY OF THE DISCLOSURE

In view of this, it is necessary to provide a power switching device that can share the same power source for reciprocating translational motion and rotational motion.

An embodiment of the present application provides a power switching device for switching power between translational motion and rotational motion, including:

An active mechanism including an active gear and a driver, the driver is connected to the active gear and is used to drive the active gear to rotate in a first direction or a second direction opposite to the first direction;

A transmission mechanism, including:
A transmission gear coaxial with the active gear;
A translation mechanism, including:
A runner coaxial with the active gear and located on a side of the active gear away from the transmission gear;
A pushing member for pushing the active gear in the direction of the transmission gear to switch power;
A rotating mechanism including a functional gear connected to the transmission mechanism; and
A reset mechanism for pushing the active gear in the direction of the runner to switch power;

The active gear can switch between a first position and a second position; in the first position, the active gear meshes with the runner and rotates in the first direction or the second direction to drive the runner to rotate, so as to drive a first functional mechanism to operate; in the second position, the active gear meshes with the transmission gear and rotates in the second direction to drive the functional gear to rotate so as to drive a second functional mechanism to operate.

In an embodiment, the translation mechanism further includes:
An auxiliary wheel;
A transmission belt with one end sleeved on the runner and the other end sleeved on the auxiliary wheel;
A translation member installed on the transmission belt, and the transmission belt is used to roll to drive the translation member to move, and the pushing member is installed on the translation member.

In one embodiment, the runner is provided with a first toothing portion on a side facing the active gear, and the active gear is provided with a second toothing portion on a side facing the runner. The second toothing portion is used to engage the first toothing portion to drive the runner to rotate; the transmission gear is provided with a third toothing portion on a side facing the active gear, and the active gear is provided with a fourth toothing portion on a side facing the transmission gear. The fourth toothing portion is used to mesh with the third toothing portion to drive the transmission gear to rotate.

In an embodiment, the power switching device further includes a switching mechanism, and the switching mechanism includes:

A fixed shaft. The active gear, the runner, and the transmission gear are rotationally sleeved on the fixed shaft, and the active gear can slide between the runner and the transmission gear;

A pressing member for contacting the pushing member and pushing the active gear, so that the active gear is separated from the runner;

A movable shaft slidably inserted into the fixed shaft along the axis, with one end connected to the reset mechanism, and the other end connected to the pressing member for resetting the pressing member.

In one embodiment, the pressing member is provided with an extension piece, and the extension piece is located between the pushing member and the active gear; the pushing member is provided with a first curved surface adjacent to the extension piece. When the pushing member approaches the pressing member, the pushing member causes the extension piece to slide relative to the first curved surface to press the extension piece, and then push the active gear toward the transmission gear.

In one embodiment, the switching mechanism further includes a connecting member. The connecting member is fixedly installed on the end of the movable shaft close to the pressing member, and the end of the pressing member away from the extension piece passes through the connecting member and is provided with a limiting portion. The limiting portion is used to hold the connecting member. When the pushing member pushes the extension piece, the limiting portion pushes the connecting member to drive the movable shaft to move. When the reset mechanism drives the movable shaft to move in the reverse direction, the connecting member pushes against the limiting portion to drive the pressing member to reset.

In one embodiment, the reset mechanism includes a resilient member. The resilient member is provided between the transmission gear and the active gear. When the pressing member is separated from the active gear, the resilient member is used to push the active gear toward the runner, so that the active gear is separated from the transmission gear and meshed with the runner to switch power.

In one embodiment, the pushing member is elastically mounted on the translation mechanism. The reset mechanism further includes a swing member, a reset gear, a rack, and a stopping member. One end of the swing member is connected to the functional gear, and the other end is connected to the reset gear. The reset gear is meshed with the functional gear. The rack can slide and one end of the rack is provided with a second curved surface. When the functional gear rotates in the first direction, the functional gear drives the swing member to move away from the rack until contacting the stopping member, the stopping member limits rotation of the swing member, and the reset gear rotates idly. When the functional gear rotates in the second direction, the functional gear drives the swing member toward the rack until the reset gear meshes with the rack, the reset gear rotates to drive the rack to slide, the second curved surface is used to push the movable shaft to cause the movable shaft to drive the pressing member to push the pushing member away from the active gear, and the resilient member resets the active gear.

An embodiment of the present application also provides an image processing device, including an image reading mechanism and a paper feeding mechanism, characterized in that further including:

An active mechanism including an active gear and a driver, the driver is connected to the active gear and is used to drive the active gear to rotate in a first direction or a second direction opposite to the first direction;

A transmission mechanism, including:

A transmission gear coaxial with the active gear;

A translation mechanism, including:

A runner coaxial with the active gear and located on a side of the active gear away from the transmission gear;

A pushing member for pushing the active gear in the direction of the transmission gear to switch power;

A rotating mechanism including a functional gear connected to the transmission mechanism; and A reset mechanism for pushing the active gear in the direction of the runner to switch power;

The active gear can switch between a first position and a second position; in the first position, the active gear meshes with the runner and rotates in the first direction or the second direction to drive the runner to rotate, so as to drive the image reading mechanism to operate; in the second position, the active gear meshes with the transmission gear and rotates in the second direction to drive the functional gear to rotate so as to drive the paper feeding mechanism to operate.

The above-mentioned power switching device drives the translation mechanism through the active mechanism to achieve translational motion, and then switches the power to the transmission mechanism through the pushing member to drive the functional gear to rotate to achieve rotational motion, and then switches the power back to the translation mechanism through the reset mechanism, thereby realizing switching the power of the power source between reciprocating translational motion and rotational motion.

| SYMBOL DESCRIPTION OF MAIN COMPONENTS | |
|---|---|
| power switching device | 100 |
| frame | 100a |
| first sliding rail | 100b |
| second sliding rail | 100c |

| SYMBOL DESCRIPTION OF MAIN COMPONENTS -continued | |
|---|---|
| active mechanism | 10 |
| active gear | 11 |
| second toothing portion | 11a |
| fourth toothing portion | 11b |
| driver | 12 |
| driving gear | 12a |
| switching mechanism | 20 |
| fixed shaft | 21 |
| through hole | 21a |
| clamping member | 21b |
| first vertical surface | 21b1 |
| pressing member | 22 |
| extension piece | 22a |
| limiting portion | 22b |
| moving shaft | 23 |
| second vertical surface | 23a |
| round end | 23b |
| connecting member | 24 |
| translation mechanism | 30 |
| translation member | 31 |
| pushing member | 32 |
| first curved surface | 32a |
| runner | 33 |
| first toothing portion | 33a |
| auxiliary wheel | 34 |
| transmission belt | 35 |
| transmission mechanism | 40 |
| transmission gear | 41 |
| third toothing portion | 41a |
| first idler | 42 |
| functional gear | 50 |
| second idler | 50a |
| reset mechanism | 60 |
| resilient member | 61 |
| swing member | 62 |
| reset gear | 63 |
| rack | 64 |
| second curved surface | 64a |
| stopping member | 65 |
| image processing device | 200 |
| image reading mechanism | 210 |
| paper feeding mechanism | 220 |

DETAILED DESCRIPTION

The technical solutions of the present application will be described below in conjunction with the drawings in the embodiments of the present application. Obviously, the described embodiments are only a part of the implementations of the present application, rather than all of the implementations.

It should be noted that when a component is referred to as being "fixed to" another component, it can be directly fixed to the other component or indirectly fixed. When a component is considered to be "connected" to another component, it can be directly connected to another component or indirectly connected. When a component is considered to be "installed on" another component, it can be directly installed on another component or indirectly installed. The terms "vertical", "horizontal", "left", "right", and similar expressions used herein are for illustrative purposes only.

Unless otherwise defined, all technical and scientific terms used herein have the same meaning as commonly understood by those skilled in the technical field of this application. The terminology used in the specification of the application herein is only for the purpose of describing specific embodiments and is not intended to limit the application. The term "or/and" as used herein includes any and all combinations of one or more related listed items.

In the following, some embodiments of the present application will be described in detail with reference to the accompanying drawings. If there is no conflict, the following embodiments and features in the embodiments can be combined with each other.

Figure 1:
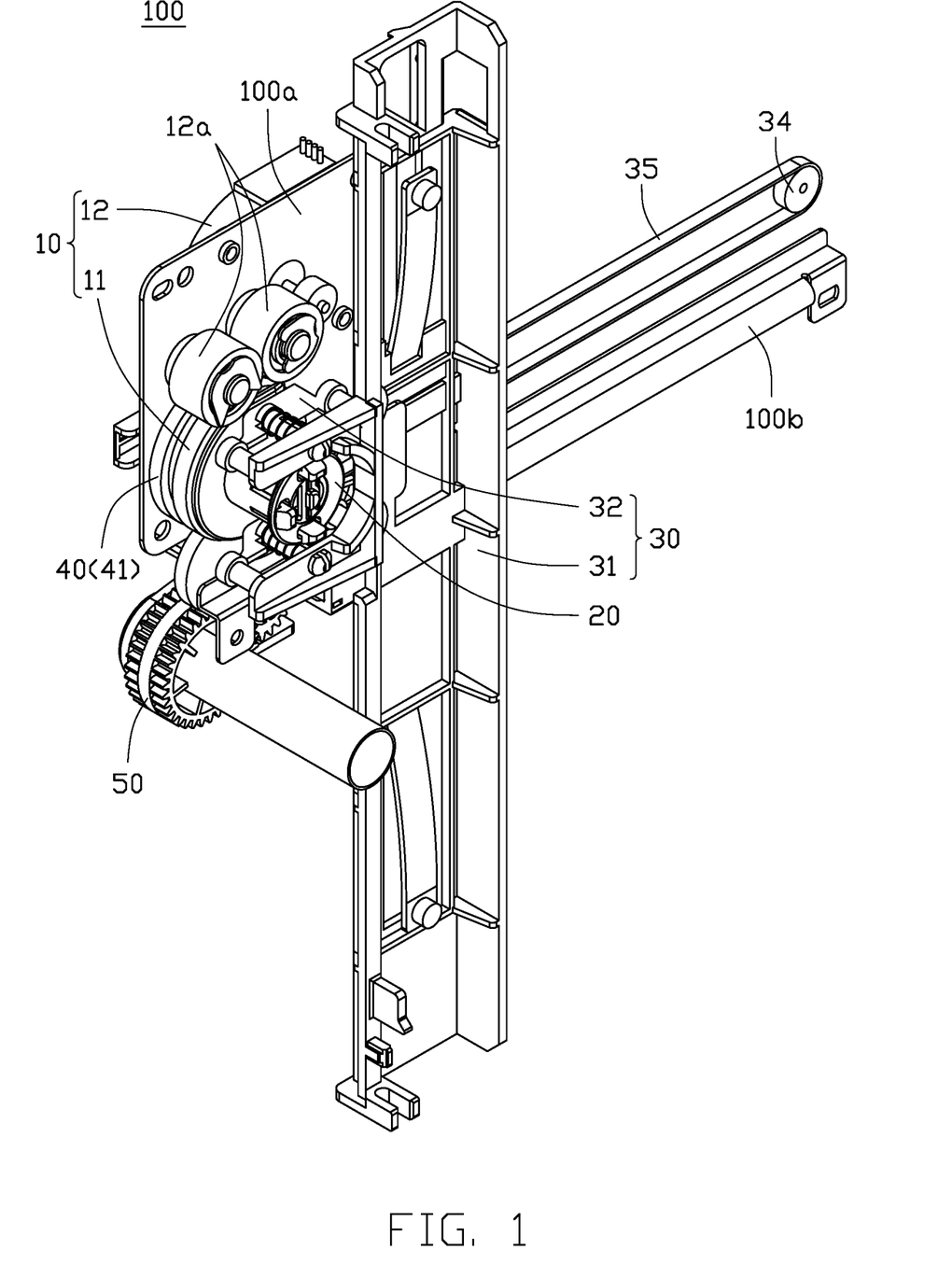
FIG. 1 is a perspective schematic diagram of a power switching device in an embodiment of this application.
Figure 2:
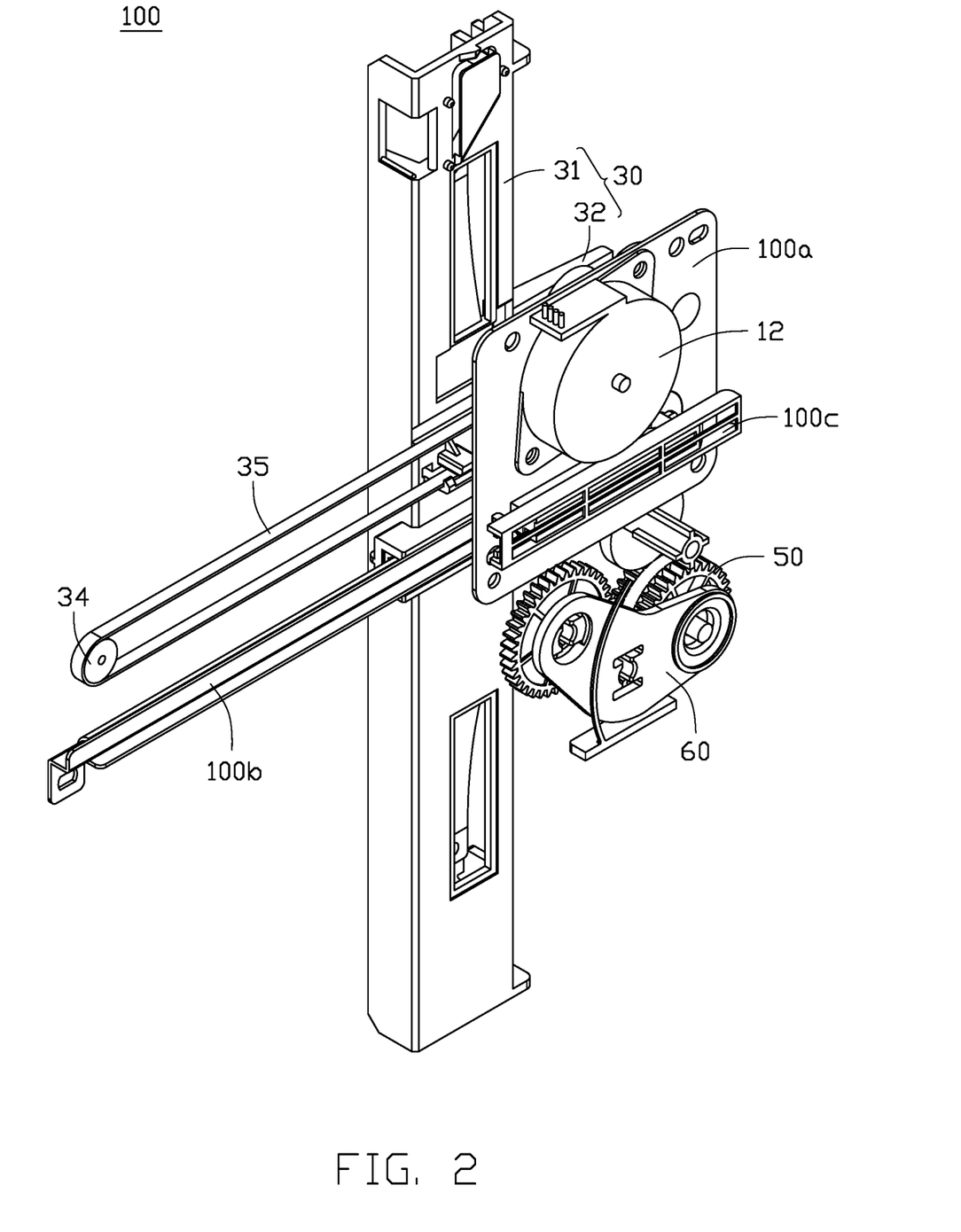
FIG. 2 is a perspective schematic diagram of a power switching device in FIG. 1 from another perspective.
Figure 3:
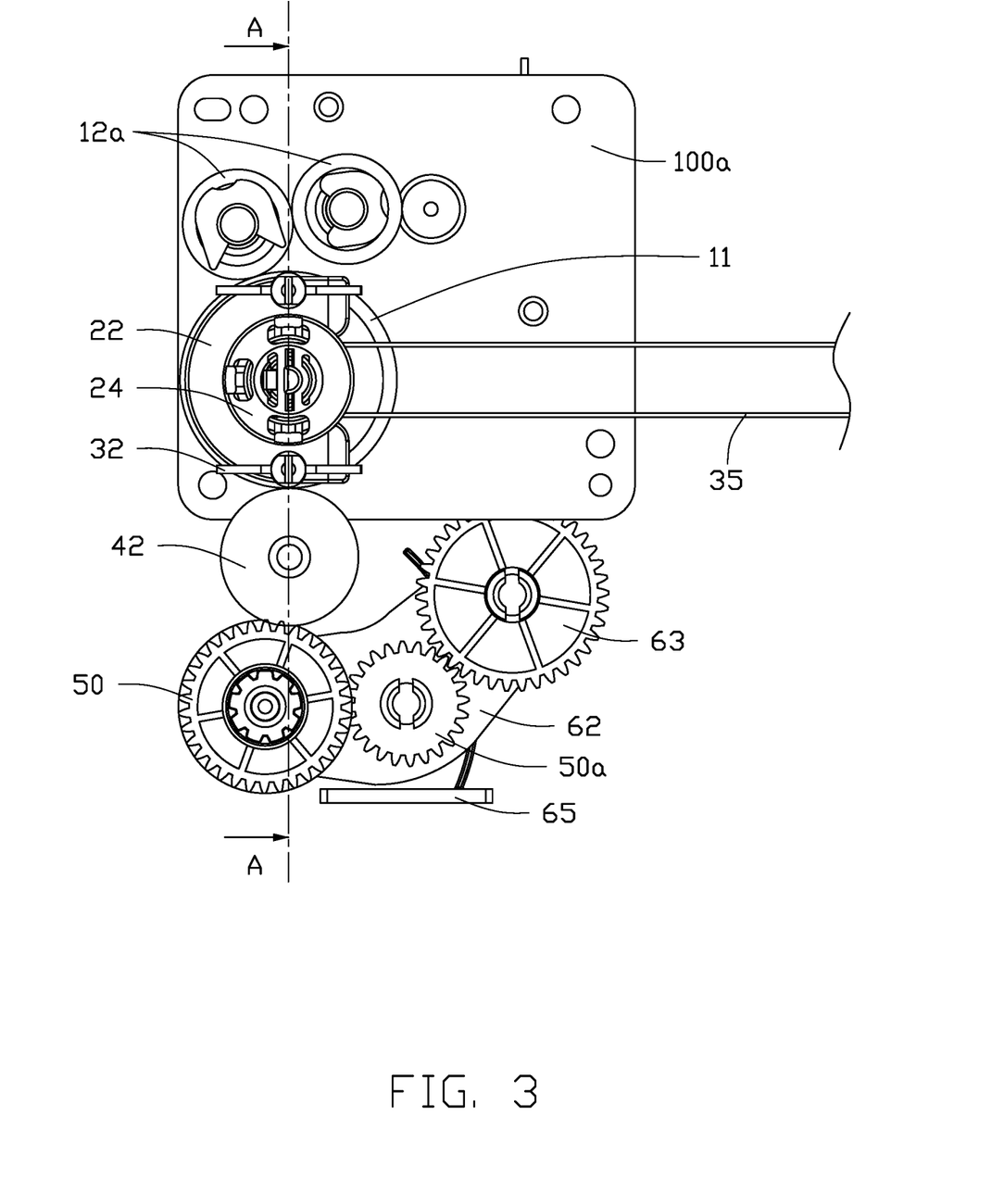
FIG. 3 is a front view of the power switching device in FIG. 1 during a rotating operation.

Referring to FIGS. 1, 2, and 3, an embodiment of the present application provides a power switching device 100 for switching a power source between translational motion and rotational motion. The power switching device 100 includes:

An active mechanism 10, including:

An active gear 11, which can slide along an axis;

A driver 12 connected to the active gear 11 for driving the active gear 11 to rotate in a first direction or a second direction opposite to the first direction; in one embodiment, the driver 12 is connected to the active gear 11 through two driving gears 12a, and a length of the driving gear 12a is greater than a moving distance of the active gear 11, so that the driving gear 12a always meshes with the active gear 11;

A transmission mechanism 40 including:

A transmission gear 41 coaxial with the active gear 11;

A translation mechanism 30 which receives a rotation of the active gear 11 to realize a translation function, including:

A runner 33 coaxial with the active gear 11 and located on a side of the active gear 11 away from the transmission gear 41;

A pushing member 32 used to push the active gear 11 in the direction of the transmission gear 41, so that the driving gear 12a is separated from the runner 33 and engages the transmission gear 41 to switch power;

A rotating mechanism including a functional gear 50 that meshes with the transmission gear 41 through a first idler 42 for rotation to achieve a rotating function;

A reset mechanism 60 used to push the active gear 11 in the direction of the runner 33 so as to disengage the active gear 11 from the transmission gear 41 and engage the runner 33 to switch power.

Figure 4:
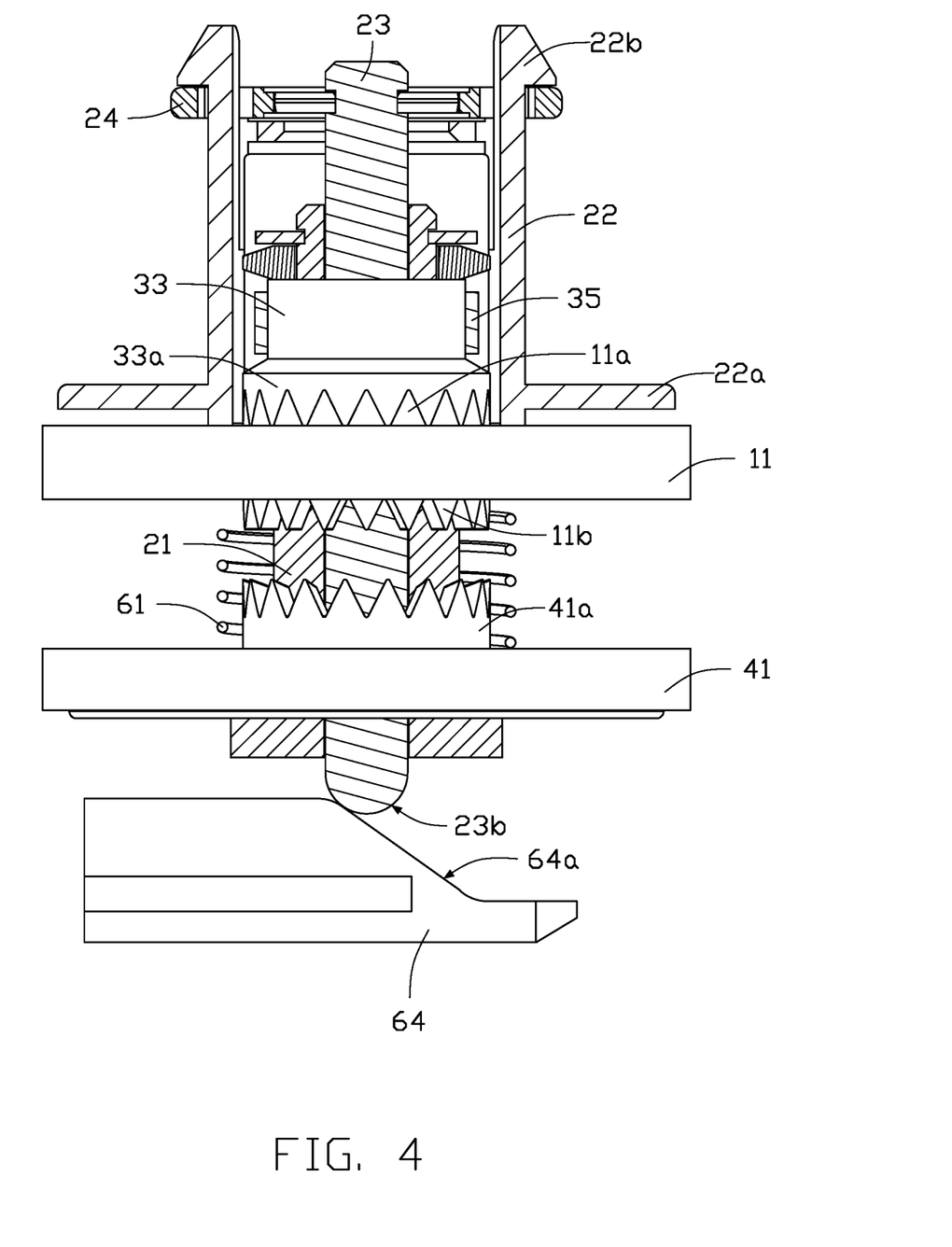
FIG. 4 is a cross-sectional view taken along line A-A when an active gear in FIG. 3 is in a first position.
Figure 5:
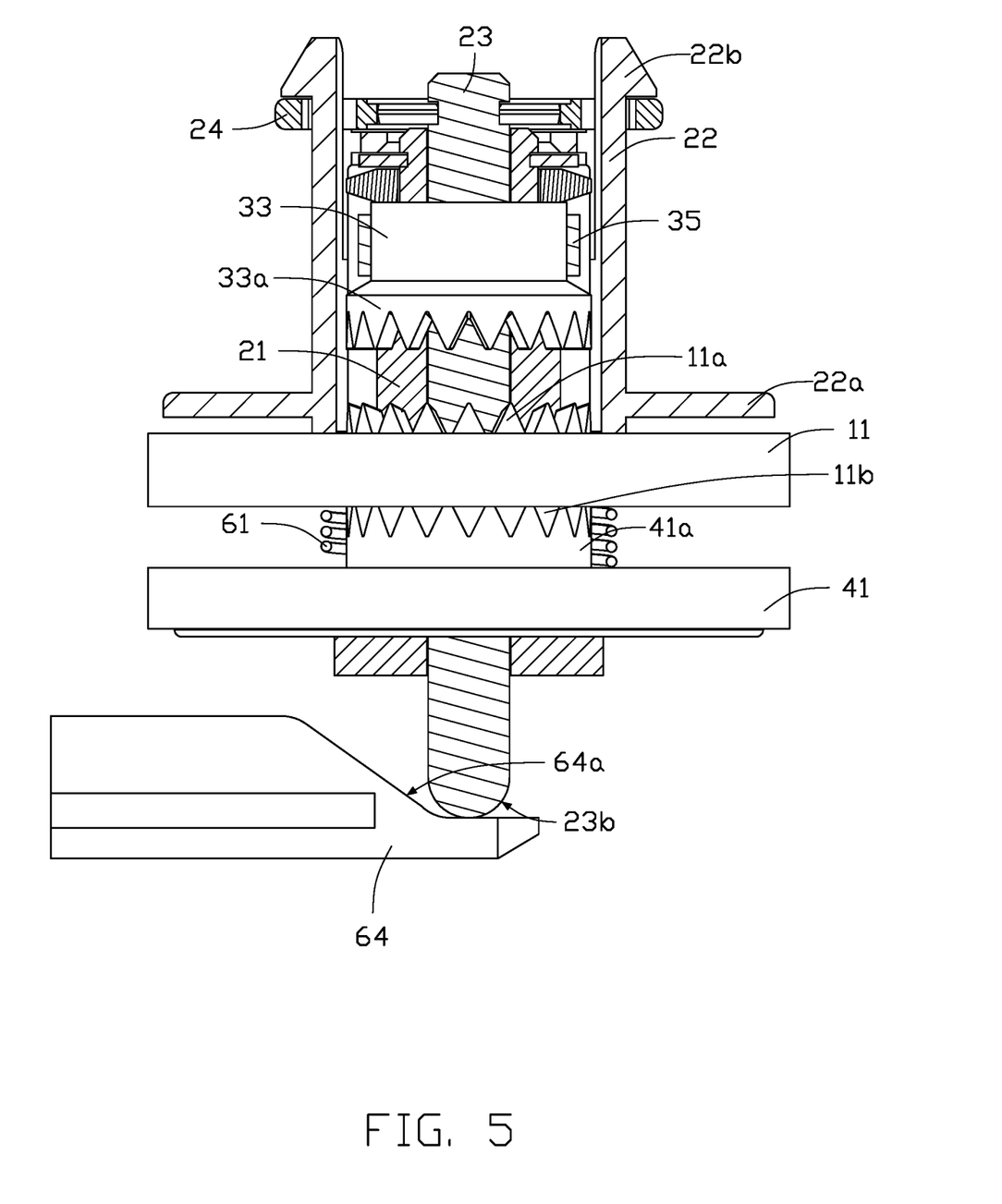
FIG. 5 is a cross-sectional view taken along line A-A when the active gear in FIG. 3 is in a second position.

Referring to FIGS. 4 and 5, the active gear 11 can switch between a first position and a second position; in the first position, the active gear 11 meshes with the runner 33 and rotates in a first direction or a second direction to drive the runner 33 to rotate; in the second position, the active gear 11 meshes with the transmission gear 41 and rotates in the second direction to drive the functional gear 50 to rotate. In one embodiment, the active mechanism 10 and the transmission mechanism 40 are both installed on a frame 100a, and a position of the frame 100a is fixed.

Referring to FIGS. 1 and 2, the translation mechanism 30 further includes an auxiliary wheel 34, a transmission belt 35, and a translation member 31. One end of the transmission belt 35 is sleeved on the runner 33, and the other end is sleeved on the auxiliary wheel 34. The translation member 31 is installed on the transmission belt 35. The transmission belt 35 is used for rolling to drive the translation member 31 to reciprocate, and the pushing member 32 is installed on the translation member 31 and moves with the translation member 31. In one embodiment, the translation member 31 is also slidably installed on a first sliding rail 100b, and the first sliding rail 100b is used to guide the translation member 31.

Referring to FIGS. 4 and 5, a side of the runner 33 facing the active gear 11 is provided with a first toothing portion 33a, and a side of the active gear 11 facing the runner 33 is provided with a second toothing portion 11a for meshing with the first toothing portion 33a to drive the runner 33 to rotate. In one embodiment, the first toothing portion 33a and the second toothing portion 11a are saw-tooth-shaped.

Referring to FIGS. 4 and 5, the transmission gear 41 is provided with a third toothing portion 41a on a side facing the active gear 11, and the active gear 11 is provided with a fourth toothing portion 11b on a side facing the transmission gear 41 for engaging the third toothing portion 41a to drive the transmission gear 41 to rotate. In one embodiment, the third toothing portion 41a and the fourth toothing portion 11b are also saw-tooth-shaped.

Figure 6:
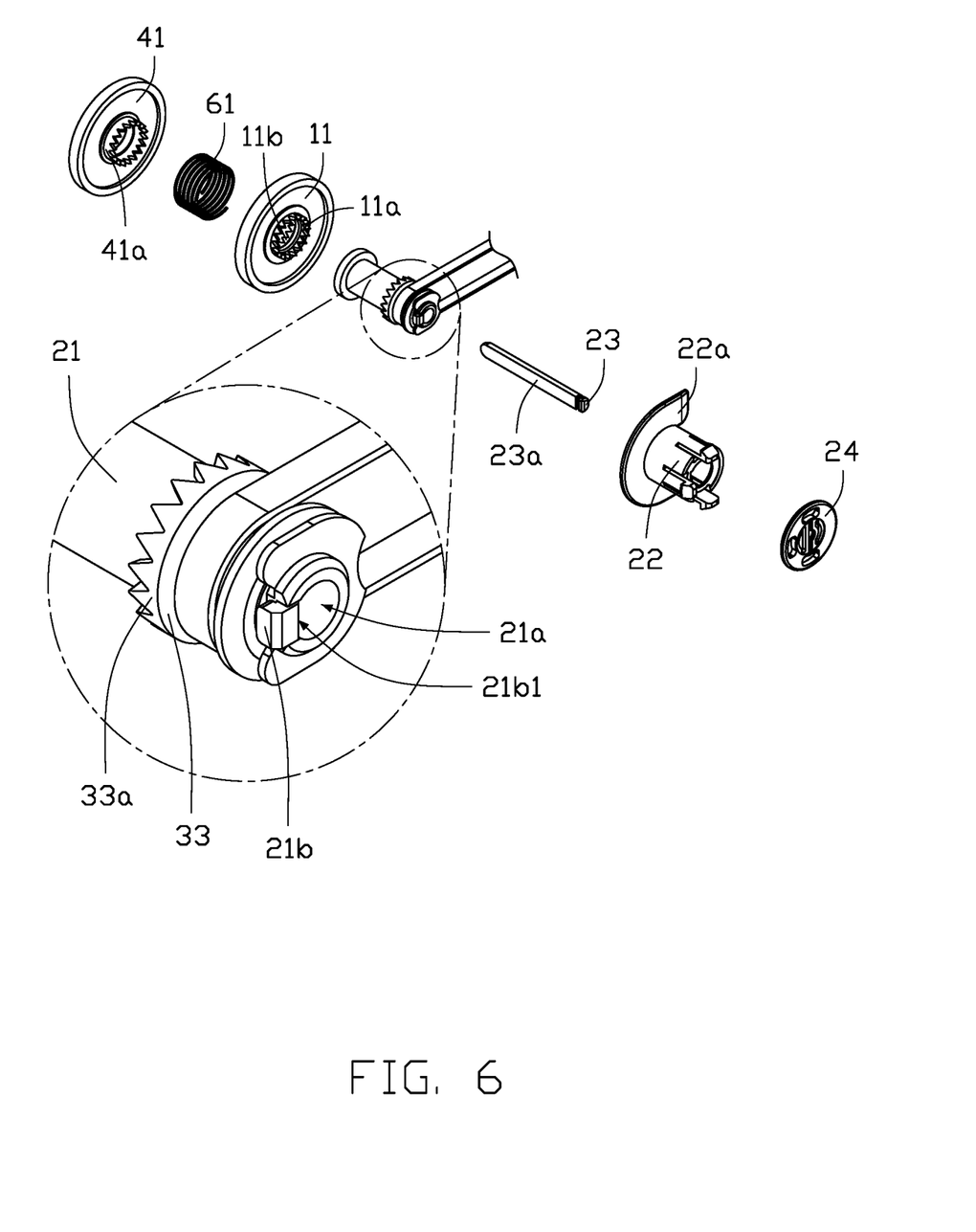
FIG. 6 is an exploded view of a switching mechanism in FIG. 1.

Referring to FIG. 6, the power switching device 100 further includes a switching mechanism 20, the switching mechanism 20 including:

A fixed shaft 21 installed on the frame 100a. The runner 33 and the transmission gear 41 are rotationally sleeved on the fixed shaft 21. The active gear 11 is slidable along an axis of the fixed shaft 21 and rotationally sleeved on the fixed shaft 21 and located between the runner 33 and the transmission gear 41;

A pressing member 22 used to contact the pushing member 32. After the pushing member 32 presses the pressing member 22, the pressing member 22 presses and pushes the active gear 11 in the direction of the transmission gear 41, so that the active gear 11 is separated from the runner 33;

A movable shaft 23 slidably penetrating the fixed shaft 21 along the axis and extending from both ends of the fixed shaft 21. One end of the movable shaft 23 is connected to the reset mechanism 60, and the other end of the movable shaft 23 is connected to the pressing member 22 for resetting the pressing member 22.

Figure 7:
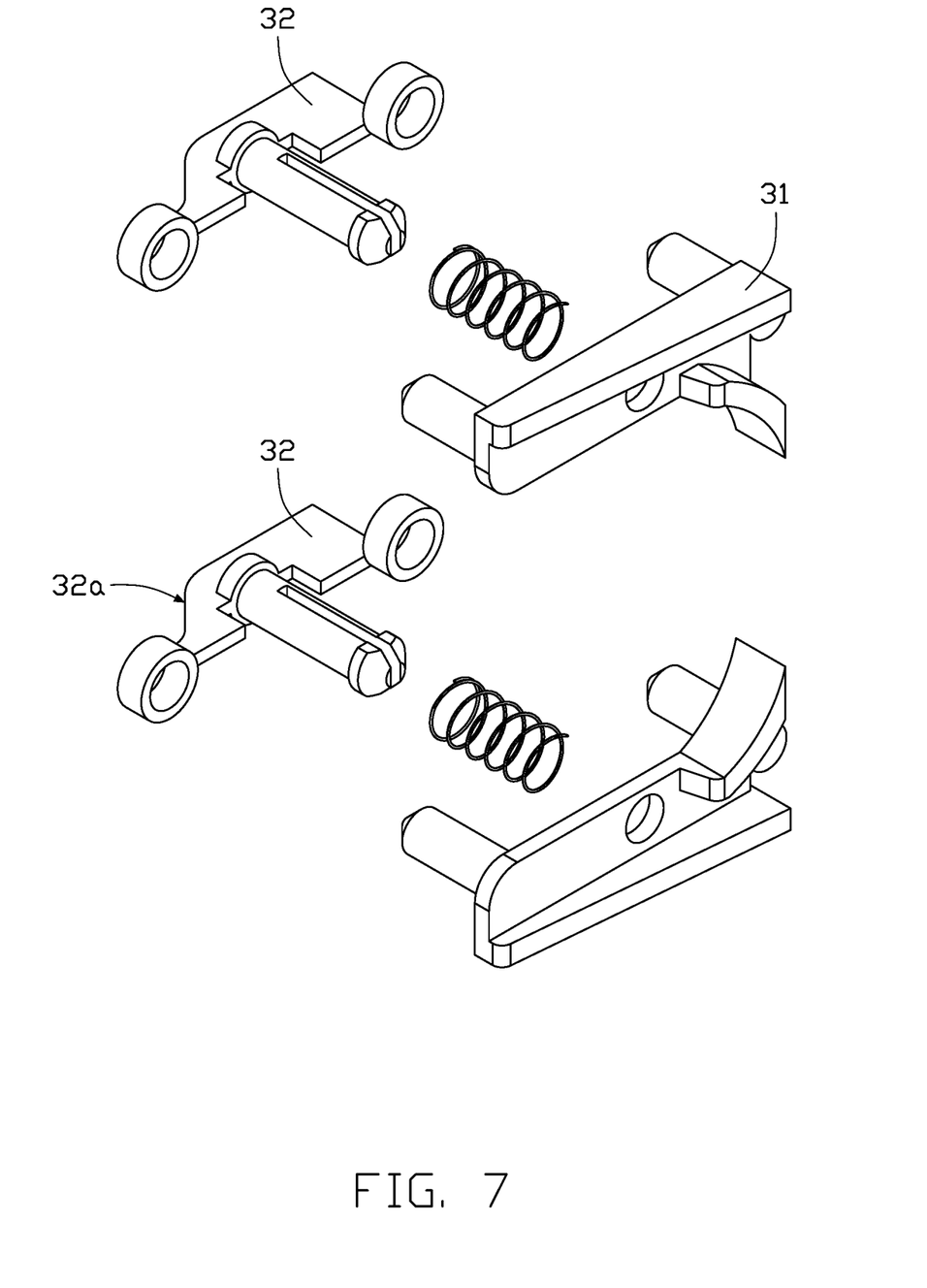
FIG. 7 is an exploded view of a pushing member in FIG. 1.

Referring to FIGS. 6 and 7, the pressing member 22 is provided with an extension piece 22a. The extension piece 22a is located between the pushing member 32 and the active gear 11. The pushing member 32 is provided with a first curved surface 32a on a side adjacent to the extension piece 22a. When the pushing member 32 is close to the pressing member 22, the pushing member 32 causes the extension piece 22a to slide relative to the first curved surface 32a to press the extension piece 22a to push the active gear 11 toward the transmission gear 41. In one embodiment, one side of the extension piece 22a close to the pushing member 32 is provided with rounded corners to reduce friction. The pressing member 22 is generally cylindrical and is slidably sleeved on the runner 33. In one embodiment, the fixed shaft 21 is provided with a through hole 21a at a shaft center, and the movable shaft 23 penetrates through the through hole 21a. At the same time, a clamping member 21b is penetrated in the through hole 21a, and both ends of the clamping member 21b clamp side walls at both ends of the through hole 21a to fix a position of the clamping member 21b. The clamping member 21b is provided with a first vertical surface 21b1, and the movable shaft 23 is provided with a second vertical surface 23a. The first vertical surface 21b1 contacts the second vertical surface 23a to prevent the movable shaft 23 from rotating, so that the extension piece 22a always faces the active gear 11.

Referring to FIG. 6, the switching mechanism 20 further includes a connecting member 24. The connecting member 24 is fixedly installed on the end of the movable shaft 23 close to the pressing member 22, and the end of the pressing member 22 away from the extension piece 22a passes through the connecting member 24 and is provided with a limiting portion 22b. The limiting portion 22b is used to hold the connecting member 24. When the pushing member 32 pushes the extension piece 22a, the limiting portion 22b pushes the connecting member 24 to drive the movable shaft 23 to move. When the reset mechanism 60 drives the movable shaft 23 to move in the reverse direction, the connecting member 24 pushes against the limiting portion 22b to drive the pressing member 22 to reset. In one embodiment, the connecting member 24 is roughly in the shape of a circular plate, and a center of the connecting member 24 is fixed on the movable shaft 23. The pressing member 22 is provided with three limiting portions 22b distributed 90 degrees apart, and the limiting portions 22b are wedge-shaped blocks with a perpendicular surface clamped on the side wall of the connecting member 24. The limiting portion 22b is elastically connected to the pressing member 22, and the limiting portion 22b can be separated from the connecting member 24 by pressing down the limiting portion 22b to facilitate the removal of the pressing member 22.

Referring to FIGS. 4 and 5, the reset mechanism 60 includes a resilient member 61. The resilient member 61 is provided between the transmission gear 41 and the active gear 11. When the pressing member 22 is separated from the active gear 11, the resilient member 61 is used to push the active gear 11 toward the runner 33, so that the active gear 11 is separated from the transmission gear 41 and meshed with the runner 33 to switch power. In one embodiment, the resilient member 61 is a spring.

Figure 8:
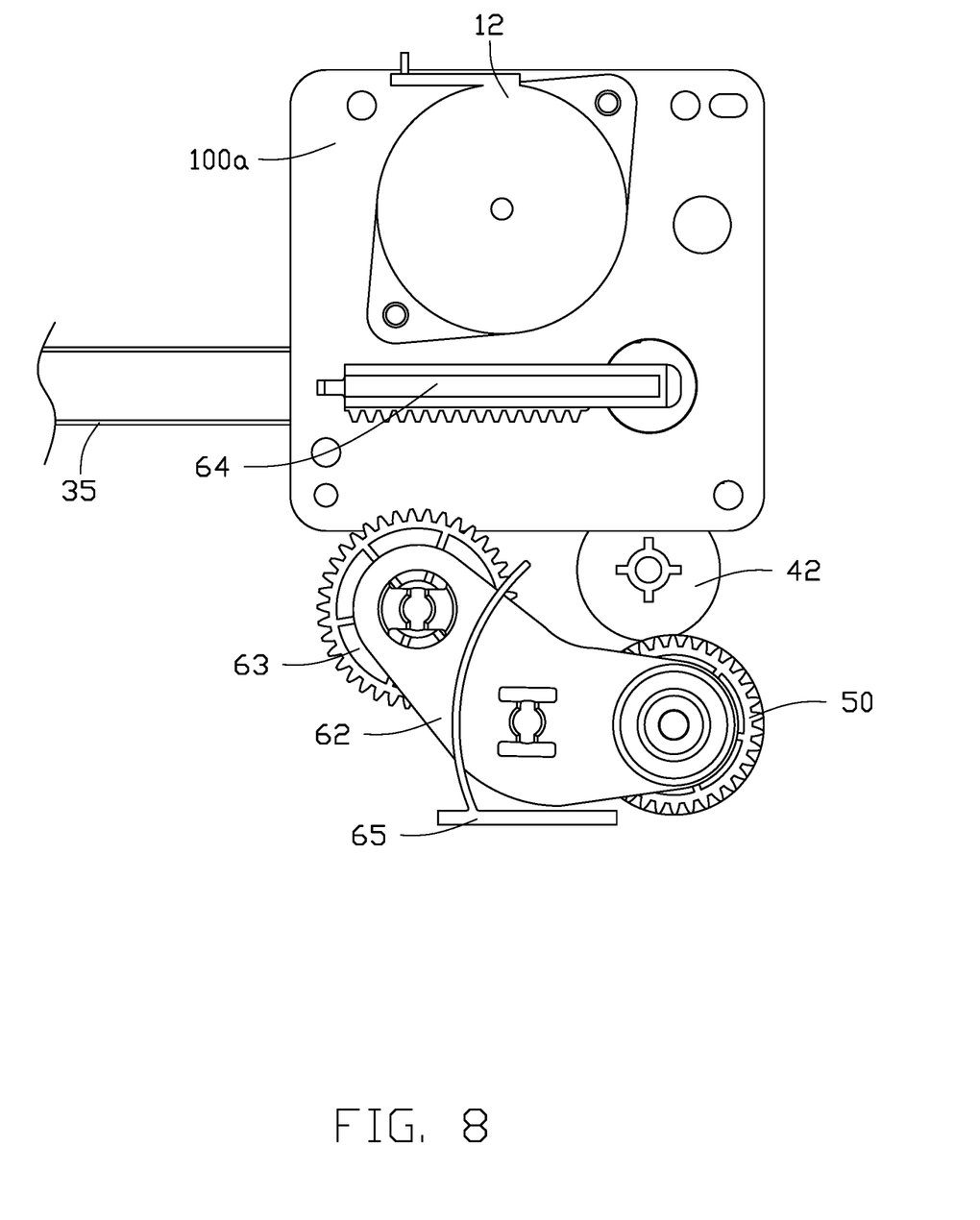
FIG. 8 is a rear view of a swing member in FIG. 3 away from a rack.
Figure 9:
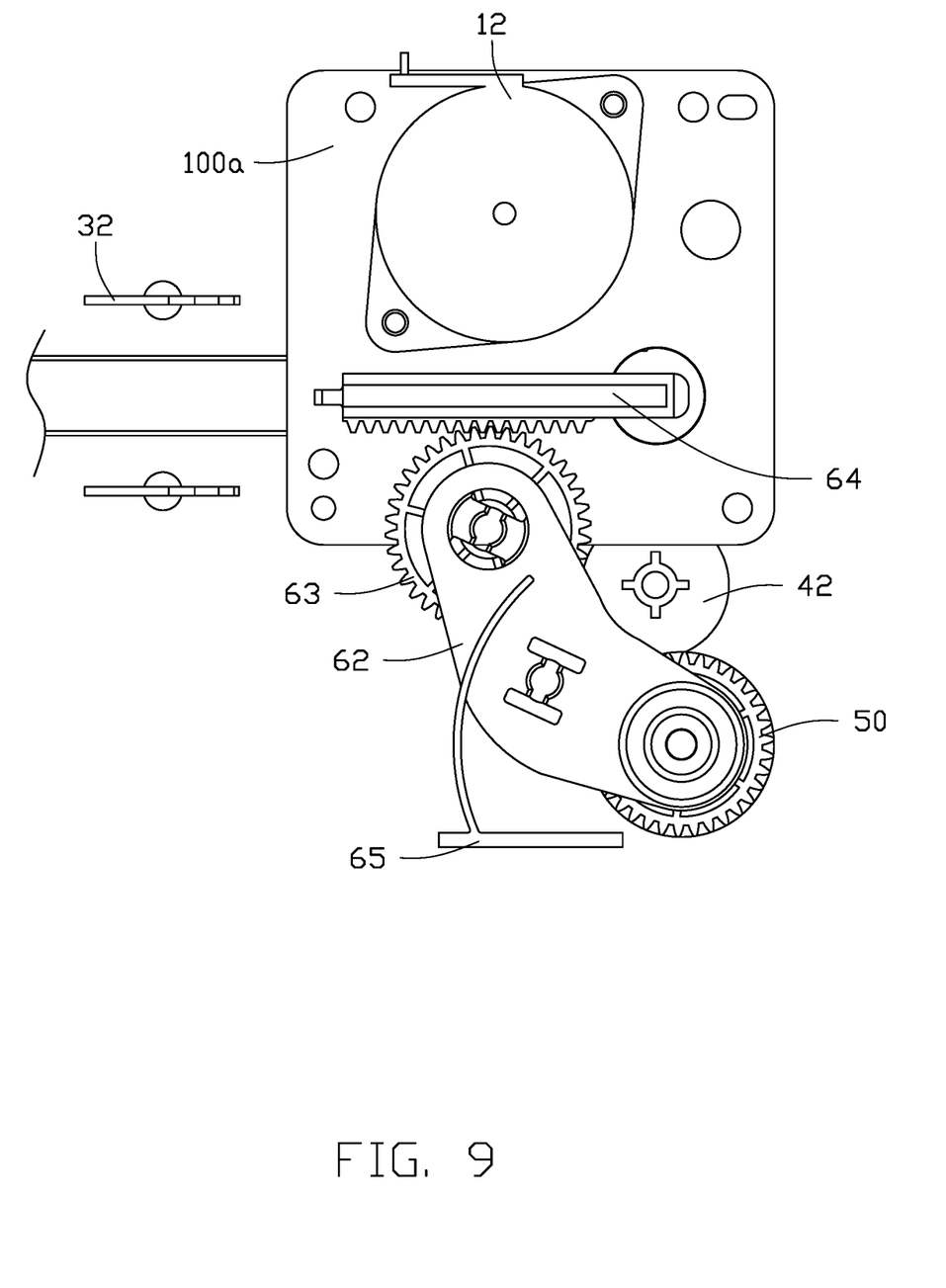
FIG. 9 is a rear view of the swing member in FIG. 3 engaging the rack.

Referring to FIGS. 8 and 9, in one embodiment, the pushing member 32 is elastically mounted on the translation member 31 by a spring, and the spring pushes the pushing member 32 in the direction of the pressing member 22 (active gear 11). The reset mechanism 60 also includes a swing member 62, a reset gear 63, a rack 64, and a stopping member 65. One end of the swing member 62 is rotationally connected to the functional gear 50, and the other end is connected to the reset gear 63, which causes the reset gear 63 to mesh with the functional gear 50. The rack 64 is slidably installed on a second slide rail 100c on the frame 100a. One end of the rack 64 is provided with a second curved surface 64a. The stopping member 65 is fixedly installed on the frame 100a. When the functional gear 50 rotates in a forward direction, the swing member 62 is driven to swing toward the stopping member 65, and the reset gear 63 is moved away from the rack 64 until the swing member 62 contacts the stopping member 65. The stopping member 65 is used to prevent excessive swinging of the swing member 62. At the same time, the functional gear 50 drives the reset gear 63 to rotate idly. When the functional gear 50 rotates in a reverse direction, the swing member 62 is driven to swing in the reverse direction so that the reset gear 63 meshes with the rack 64. At the same time, the functional gear 50 drives the reset gear 63 to rotate, the reset gear 63 drives the rack 64 to move toward the movable shaft 23 so that the second curved surface 64a pushes the movable shaft 23 away from one end of the pressing member 22, so that the movable shaft 23 drives the pressing member 22 to push the pushing member 32 away from the active gear 11. Finally, the resilient member 61 resets the active gear 11. When the pushing member 32 presses the pressing member 22 again, the movable shaft 23 pushes the rack 64 along the second curved surface 64a under the pressure of the pushing member 32, so that the rack 64 makes room for the movable shaft 23 to move backward. In one embodiment, the end of the movable shaft 23 away from the pressing member 22 (the end in contact with the second curved surface 64a) is provided with a round end 23b for reducing friction. The reset gear 63 and the functional gear 50 are engaged through a second idler 50a. The swing member 62 and the functional gear 50 can be connected by frictional interaction or by other structures.

When the switching mechanism 20 is in the initial state, the active gear 11 meshes with the runner 33 under a pushing action of the resilient member 61, the driver 12 drives the active gear 11 to rotate in the first direction or the second direction, the runner 33 drives the transmission belt 35 to reciprocate, and the transmission belt 35 drives the translation member 31 to translate in a reciprocal function. When a translation operation is completed, the driver 12 drives the active gear 11 to rotate in the second direction so that the translation member 31 approaches the pressing member 22 until the pushing member 32 pushes the pressing member 22 to drive the pressing member 22 to push the active gear 11 away from the runner 33 and engage with the transmission gear 41. At this time, the transmission belt 35 stops, the resilient member 61 compresses and stores an elastic force, and the transmission gear 41 starts to rotate and drives the functional gear 50 to rotate forward to achieve a rotation function, and at the same time, the forward rotation of the functional gear 50 drives the swing member 62 away from the rack 64 to contact the stopping member 65, and the reset gear 63 rotates idly. When a rotation operation is completed, the driver 12 drives the active gear 11 to rotate in the first direction. At this time, the transmission gear 41 starts to rotate in the reverse direction and drives the functional gear 50 to rotate in the reverse direction, and at the same time, the reverse rotation of the functional gear 50 drives the swing member 62 to approach the rack 64 until the reset gear 63 engages with the rack 64. The rotation of the functional gear 50 drives the reset gear 63 to drive the rack 64 to translate, so that the second curved surface 64a pushes the movable shaft 23 away from the end of the pressing member 22, and the movable shaft 23 drives the pressing member 22 to push the pushing member 32 so that the pushing member 32 moves away from the active gear 11. At the same time, the resilient member 61 releases the elastic force to push the active gear 11 to mesh with the runner 33 again, and then the transmission belt 35 starts to drive the translation member 31 to move away from the switching mechanism 20 to perform translation again. After the translation operation is completed again, when the pushing member 32 presses the pressing member 22 again and the swing member 62 moves away from the rack 64, the movable shaft 23 reverse pushes the rack 64 along the second curved surface 64a under the pressure of the pushing member 32 to reset the rack 64. The above-described steps are repeated to achieve the purpose of switching between a reciprocating translational movement and a rotational movement of a power source.

Figure 10:
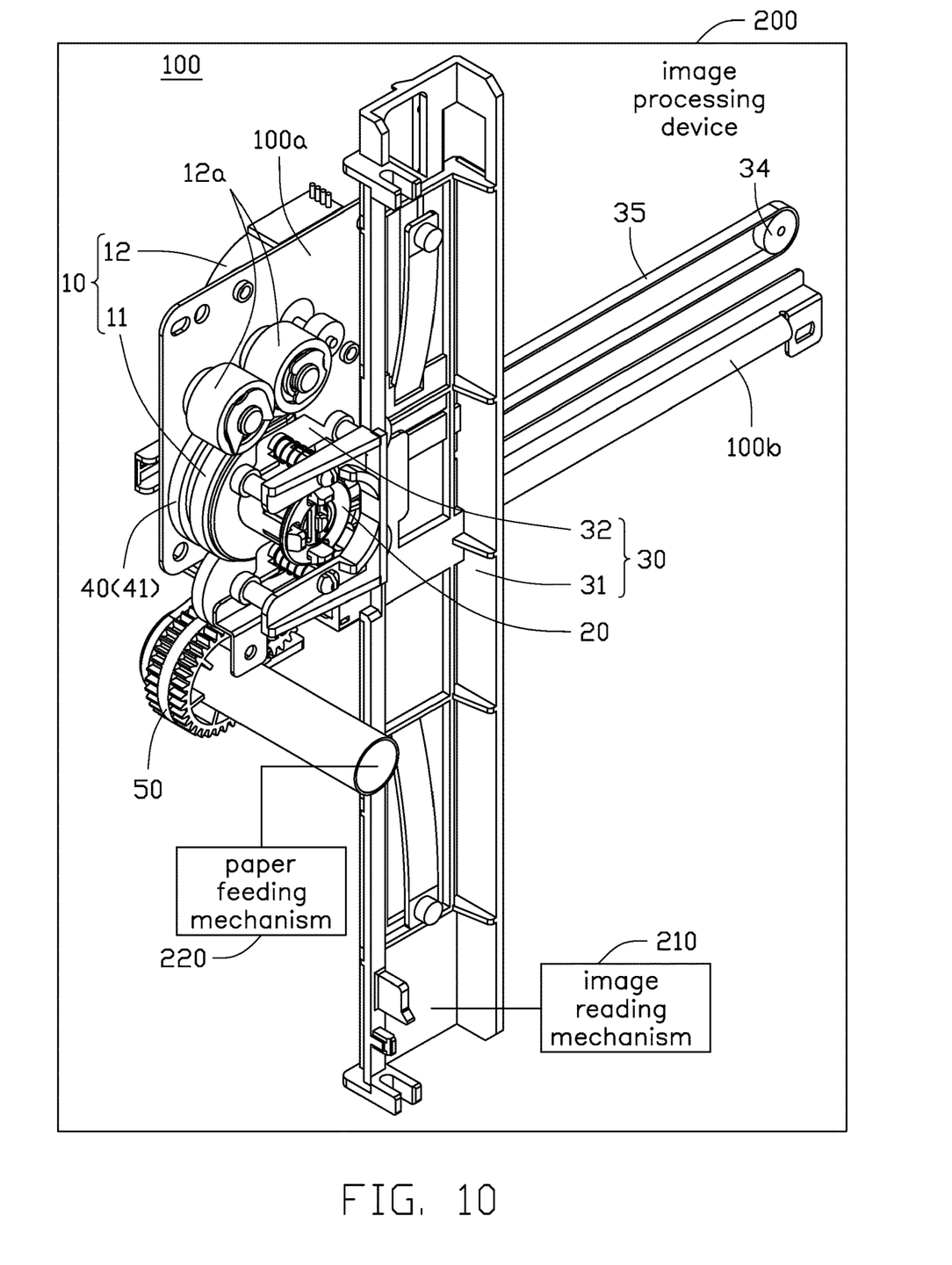
FIG. 10 is a schematic diagram of an image processing device.

Referring to FIG. 10, this application also provides an image processing device 200 including an image reading mechanism 210, a paper feeding mechanism 220, and the power switching device 100. The translation mechanism 30 is connected to the image reading mechanism 210. When the translation member 31 reciprocates on the transmission belt 35, the image reading mechanism 210 performs scanning. The functional gear 50 is connected to the paper feeding mechanism 220 to drive the paper feeding mechanism 220 to feed paper. The switching mechanism 20 and the reset mechanism 60 are used to switch the power between the image reading mechanism 210 and the paper feeding mechanism 220. In one embodiment, the driver 12 is a stepper motor, and the image processing device can continuously scan 20 pages per minute through the cooperation of the stepper motor and the transmission belt.

It is understandable that in other embodiments, the reset gear 63 and the functional gear 50 can be driven by other numbers of meshing idlers. The switching mechanism 20 can also have other structures, such as combining the pressing member 22 and the connecting member 24 into one structure.

The above-mentioned power switching device 100 drives the translation mechanism 30 through the active mechanism 10 to achieve translational motion and then switches the power to the transmission mechanism 40 through the pushing member 32 to drive the functional gear 50 to rotate to achieve rotational motion, and the power is switched back to the translation mechanism 30 through the reset mechanism 60 to achieve the purpose of switching a power source between a reciprocating translational movement and a rotational movement.

The above embodiments are only used to illustrate the technical solutions of the application and not to limit them. Although the application has been described in detail with reference to the above-preferred embodiments, those of ordinary skill in the art should understand that the technical solutions of the application can be modified or equivalently replaced. None should deviate from the spirit and scope of the technical solution of this application. Those skilled in the art can also make other changes within the spirit of this application as long as they do not deviate from the technical effects of this application. These changes made according to the spirit of this application should all be included in the scope disclosed in this application.

What is claimed is:

1. An image processing device comprising an image reading mechanism and a paper feeding mechanism, and further comprising:
    an active mechanism comprising an active gear and a driver, the driver connected to the active gear and used to drive the active gear to rotate toward a first direction or a second direction opposite to the first direction;
    a transmission mechanism comprising a transmission gear coaxial with the active gear;
    a translation mechanism comprising:
        a runner coaxial with the active gear and located on a side of the active gear away from the transmission gear;
        a pushing member for pushing the active gear in the direction of the transmission gear to switch power;
    a rotating mechanism comprising a functional gear connected to the transmission mechanism; and
    a reset mechanism for pushing the active gear in the direction of the runner to switch power; wherein:
    the active gear can switch between a first position and a second position;
    when the active gear is in the first position, the active gear meshes with the runner, and the active gear rotates toward the first direction or the second direction to drive the runner to rotate, so as to drive the image reading mechanism to operate;
    when the active gear is in the second position, the active gear meshes with the transmission gear, and the active gear rotates toward the second direction to drive the functional gear to rotate, so as to drive the paper feeding mechanism to operate.

2. The image processing device of claim 1, wherein the translation mechanism further comprises:
    an auxiliary wheel;
    a transmission belt with one end sleeved on the runner and the other end sleeved on the auxiliary wheel;
    a translation member installed on the transmission belt, the transmission belt used to roll to drive the translation member to move, and the pushing member is installed on the translation member.

3. The image processing device of claim 1, wherein:
    the runner is provided with a first toothing portion on a side facing the active gear, and the active gear is provided with a second toothing portion on a side facing the runner;
    the second toothing portion is used to engage the first toothing portion to drive the runner to rotate;
    the transmission gear is provided with a third toothing portion on a side facing the active gear, and the active gear is provided with a fourth toothing portion on a side facing the transmission gear;
    the fourth toothing portion is used to mesh with the third toothing portion to drive the transmission gear to rotate.

4. The image processing device of claim 1, wherein the power switching device further comprises a switching mechanism, the switching mechanism comprising:
    a fixed shaft, the active gear, the runner, and the transmission gear are rotationally sleeved on the fixed shaft, and the active gear can slide between the runner and the transmission gear;
    a pressing member sleeved on the fixed shaft, the pushing member pushing the pressing member to push the active gear;
    a movable shaft slidably inserted into the fixed shaft along the axis, with one end connected to the reset mechanism, and the other end connected to the pressing member, the reset mechanism pushing the movable shaft to reset the pressing member.

5. The image processing device of claim 4, wherein:
    the pressing member is provided with an extension piece located between the pushing member and the active gear;
    the pushing member is provided with a first curved surface adjacent to the extension piece;
    when the pushing member approaches the pressing member, the pushing member causes the extension piece to slide relative to the first curved surface to press the extension piece, and then push the active gear toward the transmission gear.

6. The image processing device of claim 5, wherein:
    the switching mechanism further comprises a connecting member fixedly installed on the end of the movable shaft close to the pressing member;
    the end of the pressing member away from the extension piece passes through the connecting member and is provided with a limiting portion;
    the limiting portion is used to hold the connecting member;
    when the pushing member pushes the extension piece, the limiting portion pushes the connecting member to drive the movable shaft to move;
    when the reset mechanism drives the movable shaft to reset, the connecting member pushes against the limiting portion to drive the pressing member to reset.

7. The image processing device of claim 6, wherein:
    the reset mechanism comprises a resilient member provided between the transmission gear and the active gear;
    when the pressing member is separated from the active gear, the resilient member is used to push the active gear toward the runner, so that the active gear is separated from the transmission gear and meshed with the runner to switch power.

8. The image processing device of claim 7, wherein:
    the reset mechanism further includes a swing member, a reset gear, a rack, and a stopping member;
    one end of the swing member is connected to the functional gear, and the other end is connected to the reset gear;
    the reset gear is meshed with the functional gear;
    the rack can slide and one end of the rack is provided with a second curved surface;

when the functional gear rotates toward the first direction, the functional gear drives the swing member to move away from the rack until contacting the stopping member, the stopping member limits rotation of the swing member, and the reset gear rotates idly;

when the functional gear rotates toward the second direction, the functional gear drives the swing member toward the rack until the reset gear meshes with the rack, the reset gear rotates to drive the rack to slide, the second curved surface is used to push the movable shaft to cause the movable shaft to drive the pressing member to push the pushing member away from the active gear, and the resilient member resets the active gear.

9. The image processing device of claim 1, wherein:

the active mechanism and the transmission mechanism are both installed on a frame; and a position of the frame is fixed.

10. The image processing device of claim 9, wherein:

the translation member is slidably installed on a first sliding rail of the frame; and the first sliding rail is used to guide the translation member.

\* \* \* \* \*